(12) United States Patent
Diemer

(10) Patent No.: US 9,822,854 B1
(45) Date of Patent: Nov. 21, 2017

(54) MULTI-SPEED TRANSMISSION HAVING A PARALLEL ONE-WAY CLUTCH

(71) Applicant: GM Global Technology Operations LLC, Detroit, MI (US)

(72) Inventor: Larry D. Diemer, Clarkston, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/222,400

(22) Filed: Jul. 28, 2016

(51) Int. Cl.
*F16H 3/66* (2006.01)
*F16H 3/62* (2006.01)

(52) U.S. Cl.
CPC ......... *F16H 3/66* (2013.01); *F16H 2200/006* (2013.01); *F16H 2200/2012* (2013.01); *F16H 2200/2046* (2013.01); *F16H 2200/2066* (2013.01); *F16H 2200/2082* (2013.01)

(58) Field of Classification Search
CPC .............. F16H 3/66; F16H 2200/2082; F16H 2200/2066; F16H 2200/006; F16H 2200/2012; F16H 2200/2046; F16H 3/62
See application file for complete search history.

(56) References Cited

U.S. PATENT DOCUMENTS

| 7,699,741 | B2 | 4/2010 | Hart et al. | |
|---|---|---|---|---|
| 8,152,681 | B2 * | 4/2012 | Seo | F16H 3/666 475/269 |
| 8,556,765 | B2 * | 10/2013 | Bockenstette | F16H 3/66 475/275 |
| 8,597,152 | B2 * | 12/2013 | Seo | F16H 3/66 475/276 |
| 9,091,330 | B2 * | 7/2015 | Singh | F16H 3/62 |
| 9,157,511 | B2 * | 10/2015 | Goleski | F16H 3/66 |

FOREIGN PATENT DOCUMENTS

DE  202006006003 U1  7/2006
DE  102008025303 A1  12/2008

* cited by examiner

*Primary Examiner* — Roger Pang
*Assistant Examiner* — Tinh Dang

(57) ABSTRACT

A transmission is disclosed having an input member, an output member, a plurality of planetary gear sets, a plurality of interconnecting members and a plurality of torque-transmitting mechanisms including a one-way clutch. The plurality of planetary gear sets has first, second and third members. The input member is continuously interconnected with a member of the planetary gear sets. The output member is continuously interconnected with another member of the planetary gear sets. At least eight forward speeds and one reverse speed are produced by the selective engagement of the five torque-transmitting mechanisms.

12 Claims, 2 Drawing Sheets

| GEAR STATE | CLUTCHES | | | | | |
|---|---|---|---|---|---|---|
| | 90 | 92 | 82 | 80 | 84 | 94 |
| REV | X | X | | | X | |
| N | O | O | | | | |
| 1ST | Δ | X | | X | | * |
| 2ND | Δ | X | X | | | * |
| 3RD | | X | X | X | | |
| 4TH | | X | X | | X | |
| 5TH | | X | X | | X | |
| 6TH | | | X | X | X | |
| 7TH | X | | | X | X | |
| 8TH | X | | X | | X | |

O = ENGAGED NOT CARRYING TORQUE
✻ = ENGAGED CARRYING TORQUE DURING ACCELERATION
Δ = ENGAGED CARRYING TORQUE DURING DECELERATION

MULTI-SPEED TRANSMISSION HAVING A PARALLEL ONE-WAY CLUTCH

TECHNICAL FIELD

The invention relates to a multi-speed transmission having both a plurality of planetary gear sets and torque transmitting devices that are selectively engageable to achieve multiple gear ratios.

BACKGROUND

A typical multi-speed transmission uses a combination of friction clutches and planetary gear arrangements to achieve a plurality of gear ratios. The number and placement of the planetary gear sets, generally, are dictated by packaging, cost and desired speed ratios.

While conventional transmissions achieve their intended purpose, the need for new and improved transmission configurations continues with the design of lighter and more compact vehicles. Accordingly, there is a need for a cost-effective, compact and multi-speed transmission.

SUMMARY

A transmission for a motor vehicle is provided having an input member; an output member; first, second, third and fourth planetary gear sets each having first, second and third members, wherein the input member is continuously interconnected with the second member of the second planetary gear set, and the output member is continuously interconnected with the second member of the fourth planetary gear set; a first interconnecting member continuously interconnecting the first member of the first planetary gear set with the first member of the second planetary gear set; a second interconnecting member continuously interconnecting the second member of the first planetary gear set with the third member of the fourth planetary gear set; a third interconnecting member continuously interconnecting the third member of the second planetary gear set with the first member of the third planetary gear set; a fourth interconnecting member continuously interconnecting the second member of the third planetary gear set with a second member of the fourth planetary gear set; a first torque-transmitting mechanism selectively engageable to interconnect the first member of the first planetary gear set with a stationary member; and a unidirectional torque-transmitting mechanism configured to prevent the rotation of the first member of the first planetary gear set in a first direction, thereby interconnecting the first member of the first planetary gear set with the stationary member.

In one aspect, the unidirectional torque-transmitting mechanism is a one-way clutch having a first race attached to the stationary member and a rotatable second race connecting the first race to the first member of the first planetary gear set, wherein the second race is non-rotatable in the first direction.

In one aspect, the transmission further includes a second torque-transmitting mechanism selectively engageable to interconnect the third member of the first planetary gear set with the stationary member and a third torque-transmitting mechanism selectively engageable to interconnect the second member of the second planetary gear set with the first member of the fourth planetary gear set. The one-way clutch interconnects the first member of the first planetary gear set with the stationary member when (i) the second torque-transmitting mechanism is engaged to interconnect the third member of the first planetary gear set with the stationary member and (ii) the third torque-transmitting mechanism is engaged to interconnect the second member of the second planetary gear set with the first member of the fourth planetary gear set.

In one aspect, the transmission further includes a fourth torque-transmitting mechanism selectively engageable to interconnect to the first member of the third planetary gear set with the first member of fourth planetary gear set. The one-way clutch interconnects the first member of the first planetary gear set with the stationary member when (i) the second torque-transmitting mechanism is engaged to interconnect the third member of the first planetary gear set with the stationary member and (ii) the fourth torque-transmitting mechanism is engaged to interconnect to the first member of the third planetary gear set with the first member of fourth planetary gear.

In one aspect, the one-way clutch disconnects the first member of the first planetary gear set with the stationary member when simultaneously (i) the second torque-transmitting mechanism is engaged to interconnect the third member of the first planetary gear set with the stationary member, (ii) the third torque-transmitting mechanism is engaged to interconnect the second member of the second planetary gear set with the first member of the fourth planetary gear set, and (iii) the fourth torque-transmitting mechanism is engaged to interconnect to the first member of the third planetary gear set with the first member of fourth planetary gear.

In another aspect, the first torque-transmitting mechanism is engaged to interconnect the first member of the first planetary gear set with the stationary member when the transmission is downshifting.

In another aspect, the first torque-transmitting mechanism is disengaged when the transmission is upshifting.

In still another aspect, the transmission further includes a fifth torque-transmitting mechanism selectively engageable to interconnect the third member of the third planetary gear set with the first member of the fourth planetary gear set. The torque-transmitting mechanisms are selectively engageable in combinations of at least three to establish at least eight forward speed ratios and at least one reverse speed ratio between the input member and the output member.

In still another aspect, the first member is a sun gear; the second member is a carrier member; the third member is a ring gear; the input member is continuously connected to the carrier member of the second planetary gear set; and the output member is continuously connected to the carrier member of the fourth planetary gear set.

In yet another aspect, the first torque-transmitting mechanism selectively interconnects a sun gear of the first planetary gear set and a sun of the second planetary gear set with the stationary member; the second torque-transmitting mechanism selectively interconnects a ring gear of the first planetary gear set with the stationary member; the third torque-transmitting mechanism selectively interconnects the input member and the carrier member of the second planetary gear set with a sun gear of the fourth planetary gear set; the fourth torque-transmitting mechanism selectively interconnects a sun gear of the fourth planetary gear set with a sun gear of the third planetary gear set and a ring gear of the second planetary gear set; and the fifth torque-transmitting mechanism selectively interconnects a ring gear of the third planetary gear set with a sun gear of the fourth planetary gear set.

Also provided is a transmission having an input member; an output member; first, second, third and fourth planetary gear sets each having first, second and third members, wherein the input member is continuously interconnected with the second member of the second planetary gear set, and the output member is continuously interconnected with the second member of the fourth planetary gear set; a first interconnecting member continuously interconnecting the first member of the first planetary gear set with the first member of the second planetary gear set; a second interconnecting member continuously interconnecting the second member of the first planetary gear set with the third member of the fourth planetary gear set; a third interconnecting member continuously interconnecting the third member of the second planetary gear set with the first member of the third planetary gear set; a fourth interconnecting member continuously interconnecting the second member of the third planetary gear set with a second member of the fourth planetary gear set; a first torque-transmitting mechanism selectively engageable to interconnect the first member of the first planetary gear set with a stationary member; and a one-way clutch in parallel with the first torque-transmitting mechanism, wherein the one-way clutch restricts the rotation of the first member of the first planetary gear set in a first direction, thereby interconnecting the first member of the first planetary gear set with the stationary member.

In one aspect, the one-way clutch includes a first race grounded to the stationary member and a rotatable second race connecting the first race to the first member of the first planetary gear set.

In another aspect, the second race of the one-way clutch is non-rotatable in the first direction.

In another aspect, the second race of the one-way clutch is freely rotatable in a second direction.

Yet in another aspect, the one-way clutch is a selectable one-way clutch.

Further provided is a transmission having an input member; an output member; first, second, third and fourth planetary gear sets each having a sun gear, a planet gear carrier and a ring gear, wherein the input member is continuously interconnected with the planet carrier of the second planetary gear set, and the output member is continuously interconnected with the planet carrier of the fourth planetary gear set; a first interconnecting member continuously interconnecting the sun gear of the first planetary gear set with the sun gear of the second planetary gear set; a second interconnecting member continuously interconnecting the planet gear carrier of the first planetary gear set with the ring gear of the fourth planetary gear set; a third interconnecting member continuously interconnecting the ring gear of the second planetary gear set with the sun gear of the third planetary gear set; a fourth interconnecting member continuously interconnecting the planet gear carrier of the third planetary gear set with the planet gear carrier of the fourth planetary gear set; a first torque-transmitting mechanism selectively engageable to interconnect the sun gear of the first and second planetary gear sets with a stationary member; a second torque-transmitting mechanism selectively engageable to interconnect the ring gear of the first planetary gear set with the stationary member; a third torque-transmitting mechanism selectively engageable to interconnect the planet gear carrier of the second planetary gear set with the sun gear of the fourth planetary gear set; a fourth torque-transmitting mechanism selectively engageable to interconnect the sun gear of the third planetary gear set with the sun gear of fourth planetary gear set; a fifth torque-transmitting mechanism selectively engageable to interconnect the ring gear of the third planetary gear set with the sun gear of the fourth planetary gear set; and a unidirectional torque-transmitting mechanism interconnecting the sun gear of the first planetary gear set with the stationary member.

In one aspect, the unidirectional torque-transmitting mechanism is a one-way clutch.

In another aspect, the one-way clutch includes a first race attached to the stationary member and a rotatable second race connecting the first race to the sun gear of the first planetary gear set.

Still in another aspect, the one-way clutch is configured to prevent the rotation of the sun gear of the first planetary gear set in a first direction, thereby interconnecting the sun gear of the first planetary gear set with the stationary member.

Yet, still in another aspect, the torque-transmitting mechanisms are selectively engageable in combinations of at least three to establish at least eight forward speed ratios and at least one reverse speed ratio between the input member and the output member.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figures 1, 2:
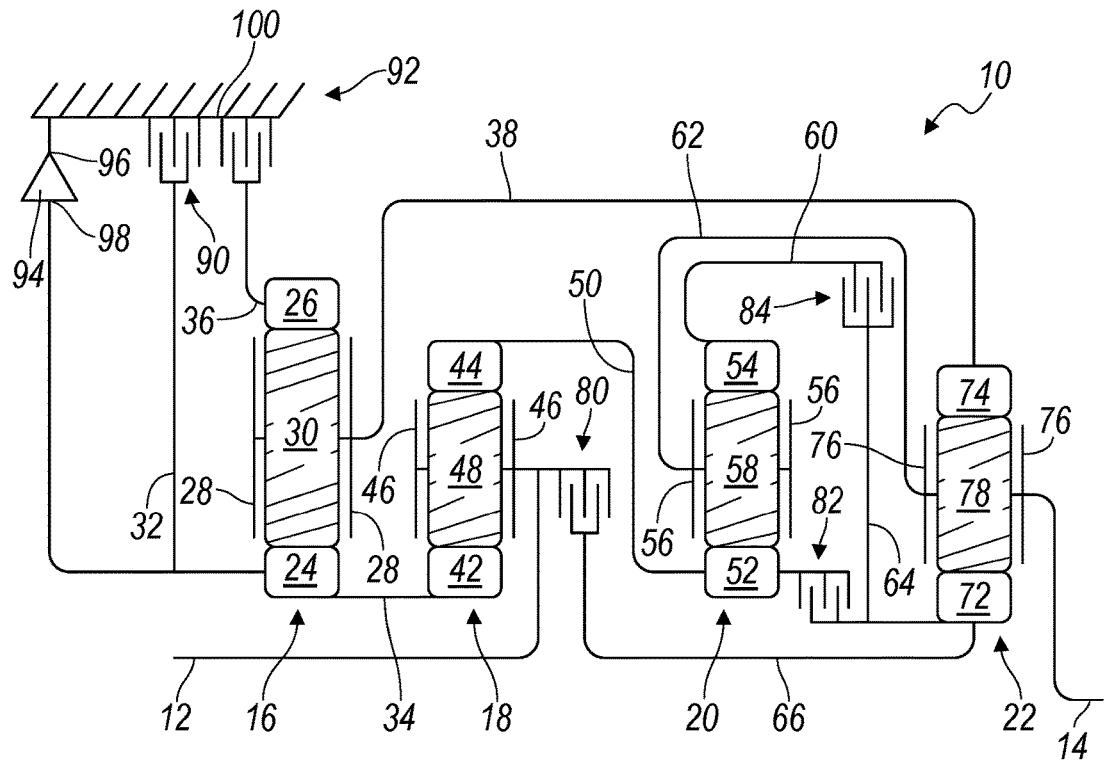
FIG. 1 is a schematic representation of an embodiment of a transmission in accordance with the present invention.
FIG. 2 is a truth table listing the engaged torque-transmitting mechanisms for selected torque ratios achieved by the transmission of FIG. 1.

Referring to the drawings, wherein like reference numbers refer to like components, in FIG. 1 a multi-speed transmission 10 is depicted. The transmission 10 includes an input member 12 and an output member 14. In the present embodiment, input member 12 and output member 14 are shafts, and will be referred to as such. Those skilled in the art will appreciate that the input and output members 12, 14 may be components other than shafts. The input shaft 12 is continuously connected to an engine (not shown) or to a turbine of a torque converter (not shown). The output shaft 14 is continuously connected with the final drive unit or transfer case (not shown).

Transmission 10 includes four planetary gear sets 16, 18, 20 and 22. The planetary gear sets 16, 18, 20 and 22 are connected between the input shaft 12 and the output shaft 14. In a preferred embodiment of the present invention, planetary gear set 16 is a simple planetary gear set that includes a sun gear member 24, a ring gear member 26 and a carrier member 28 that rotatably supports a set of pinion gears 30 (only one shown). Sun gear member 24 is connected for common rotation with first outer shaft 32 and first intermediate shaft 34. Ring gear member 26 is connected for common rotation with second outer shaft 36. Pinion gears 30 are configured to intermesh with sun gear member 24 and ring gear member 26. Carrier member 28 is connected for common rotation with second intermediate shaft 38.

In a preferred embodiment of the present invention, planetary gear set 18 is a simple planetary gear set. More specifically, planetary gear set 18 includes a sun gear member 42, a ring gear member 44 and a carrier member 46 that rotatably supports a set of pinion gears 48 (only one shown). Sun gear member 42 is connected for common rotation with first intermediate shaft 34. Ring gear member 44 is connected for common rotation with a third intermediate shaft 50. Carrier member 46 is connected for common rotation with an input shaft 12. Pinion gears 48 are configured to intermesh with both sun gear member 42 and ring gear member 44.

In a preferred embodiment of the present invention, planetary gear set 20 is a simple planetary gear set that includes a sun gear member 52, a ring gear member 54 and a carrier member 56 that rotatably supports a set of pinion gears 58 (only one shown). Sun gear member 52 is connected for common rotation with a third intermediate shaft 50. Ring gear member 54 is connected for common rotation with fourth intermediate shaft 60. Carrier member 56 is connected for common rotation with fifth intermediate shaft 62. Pinion gears 58 are configured to intermesh with both sun gear member 52 and ring gear member 54.

In a preferred embodiment of the present invention, planetary gear set 22 is a simple planetary gear set that includes a sun gear member 72, a ring gear member 74 and a carrier member 76 that rotatably supports a set of pinion gears 78 (only one shown). Sun gear member 72 is connected for common rotation with sixth intermediate shaft 64 and seventh intermediate shaft 66. Ring gear member 74 is connected for common rotation with second intermediate shaft 38. Carrier member 76 is connected for common rotation with an output shaft 14. Pinion gears 78 are configured to intermesh with both sun gear member 72 and ring gear member 74.

The transmission 10 includes a variety of torque-transmitting mechanisms or devices including a first intermediate clutch 80, a second intermediate clutch 82, a third intermediate clutch 84, a first brake 90, a second brake 92, and a unidirectional torque-transmitting mechanism 94 such as a one-way clutch or a selectable one-way clutch. First intermediate clutch 80 is selectively engageable to connect seventh intermediate shaft 66 to carrier member 46 and input shaft 12. Second intermediate clutch 82 is selectively engagable to connect sixth intermediate shaft 64 to sun gear member 52. Third intermediate clutch 84 is selectively engagable to connect fourth intermediate shaft 60 to sixth intermediate shaft 64. Brake 90 is selectively engageable to connect outer shaft 32 to transmission housing 100 to restrict rotation of shaft 32 relative to housing 100. Brake 92 is selectively engageable to connect outer shaft 36 to housing 100 to restrict rotation of shaft 36 relative to housing 100. The one-way clutch 94 connects the outer shaft 36 to the housing 100 in parallel with brake 90, such that the one-way clutch 94 is operable to restrict the rotation of the outer shaft 36 relative to the housing 100 in a first direction while permitting the rotation of the outer shaft 36 in a second direction when the brake 90 is not engaged. The one-way clutch includes a first race 96 attached to the housing 100 and a rotatable second race 98 connecting the first race 96 to the sun gear 24 of the first planetary gear set 16. The second race 98 is non-rotatable in the first direction and free to rotate in the second direction.

The transmission 10 is capable of transmitting torque from the input shaft 12 to the output shaft 14 in at least eight forward torque ratios and one reverse torque ratio as indicated in the truth table of FIG. 2. Each of the forward torque ratios and the reverse torque ratios is attained by engagement of one or more of the torque-transmitting mechanisms (i.e. first intermediate clutch 80, a second intermediate clutch 82, a third intermediate clutch 84, a brake 90 and a brake 92). Those skilled in the art will readily understand that a different speed ratio is associated with each torque ratio. Thus, at least eight forward speed ratios and at least one reverse speed ratio may be attained by transmission 10. An example of the gear ratios that may be obtained using the embodiments of the present invention are also shown in FIG. 2. Of course, other gear ratios are achievable depending on the gear diameter, gear tooth count and gear configuration selected.

Figure 3:
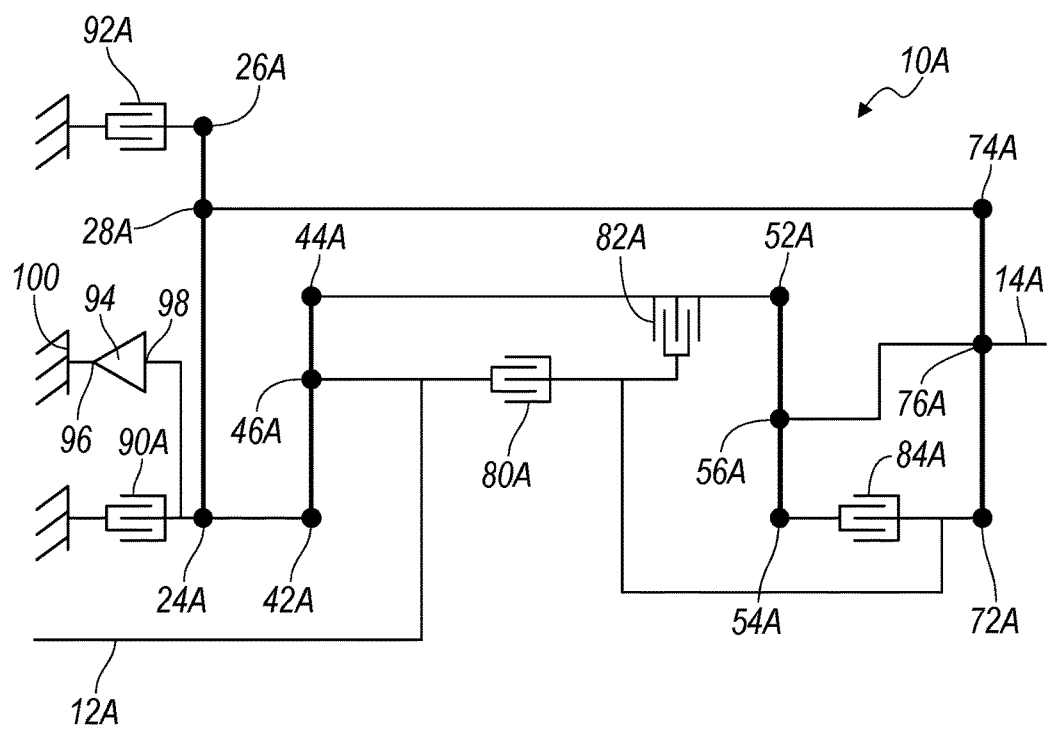
FIG. 3 is a lever diagram of the transmission of FIG. 1 illustrating the power flow from the input through the gear sets to the output, in accordance with the present invention.

A lever diagram 10A is shown in FIG. 3 that is representative of transmission 10 of FIG. 1, as well as the connections for the clutches 80, 82, 84 and brakes 90, 92. The nodes 24A, 26A, 28A, 42A, 44A, 46A, 52A, 54A, 56A, 72A, 74A and 76A of the lever diagram 10A represent the gear members 24, 26, 28, 42, 44, 46, 52, 54, 56, 72, 74 and 76 of FIG. 1 such that the same numerical designation with the addition of an A suffix is used to identify the corresponding node. For example, the nodes 24A and 42A shown in FIG. 3 represent sun gears 24 and 42 respectively shown in FIG. 1. Other components of FIG. 3 have the same numbering convention for the corresponding components in FIG. 1. Moreover, the operation or engagement of clutches 80, 82, 84 and brakes 90, 92 to establish the various forward and reverse gear speeds will now be described with continuing reference to FIGS. 1, 2 and 3.

To establish the reverse torque ratio (Rev), the torque-transmitting mechanisms or clutches are selected as set forth in the table of FIG. 2. As shown in FIG. 2, first and second brakes 90, 92 and third intermediate clutch 84 are engaged to achieve the reverse torque ratio (Rev).

In neutral, none of the clutches or brakes are carrying torque. As noted in FIG. 2, in this gear state, the first and second brakes 90 and 92 are engaged but not carrying torque.

A first forward torque ratio, indicated as $1^{ST}$ (first gear) in the truth table of FIG. 2, is achieved by engaging second brake 92 and first intermediate clutch 80 while the one-way clutch 94 restricts the rotation of the first outer shaft 32 in the first direction. An arrow is provided in FIG. 2 that indicates which torque transmitting mechanism is released and which is engaged during sequential shifting. For example, when shifting from Reverse to $1^{ST}$, third intermediate clutch 84 is released and first intermediate clutch 80 is engaged.

A subsequent forward torque ratio, indicated as $2^{nd}$ (second gear) in FIG. 2, is established by the engagement of the second brake 92 and second intermediate clutch 82, and restricting the rotation of the first outer shaft 32 in the first direction with the one-way clutch 94. The shift from first gear to second gear occurs as follows: releasing first intermediate clutch 80 and engaging second intermediate clutch 82 while maintaining engagement of brake 92. An arrow is provided in FIG. 2 that emanates from the clutch that is released (clutch 80) and points to the clutch that is engaged (clutch 82). Brake 90 remains disengaged when transitioning from $1^{ST}$ (first gear) to $2^{nd}$ (second gear).

During the transition of releasing the first intermediate clutch 80 and engaging the second intermediate clutch 82, due to operating variabilities such as input torque disturbances, gear tolerances, and centrifugal variations; there may be a split second where the first intermediate clutch 80 and second intermediate clutch 82 are both simultaneously engaged. The simultaneous engagement of the both intermediate clutches 80, 82 induce the first outer shaft 32 to rotate in a second direction. If brake 90 was engaged, the attempted rotation of the outer shaft 32 in the second direction would result in a binding of the transmission causing a momentary deceleration of the vehicle. By brake 90 remaining disengaged during the shift from $1^{st}$ (first gear) to $2^{nd}$ (second gear), the one-way clutch 94 accommodates this split second change in rotational direction of the first outer shaft 32 by allowing the first outer shaft 32 to rotate, or overrun, in the second direction until the transition of releasing the first intermediate clutch 80 and engaging the second intermediate clutch 82 is completed.

The subsequent torque ratio, indicated as $3^{rd}$ (third gear) in the truth table of FIG. 2, is established by the engagement of second brake 92, first and second intermediate clutches 80 and 82. The shift from second gear to third gear occurs as follows: clutch 82 and brake 92 remain engaged, clutch 80 is engaged, and the one-way clutch 94 disengages by overrunning in the second direction.

The next subsequent forward torque ratio, indicated as $4^{th}$ (fourth gear) in the truth table of FIG. 2, is established with the engagement of second brake 92, second and third intermediate clutches 82, 84. The shift from third gear to fourth gear is achieved as follows: engagement of clutch 82 and brake 92 are maintained, clutch 80 is released and clutch 84 is engaged. An arrow is provided in FIG. 2 that emanates from the clutch that is released (clutch 80) and points to the clutch that is engaged (clutch 84).

A subsequent forward torque ratio indicated as $5^{th}$ (fifth gear) in FIG. 2, is established with the engagement of second brake 92 and first and third intermediate clutches 80 and 84. The shift from fourth gear to fifth gear occurs as follows: the engagement of clutch 84 and second brake 92 are maintained, clutch 82 is released and clutch 80 is engaged. An arrow is provided in FIG. 2 that emanates from the clutch that is released (clutch 82) and points to the clutch that is engaged (clutch 80).

A subsequent forward torque ratio indicated as $6^{th}$ (sixth gear), in the truth table of FIG. 2, is established with the engagement of first, second and third intermediate clutches 80, 82 and 84. The shift from fifth gear to sixth gear occurs as follows: the engagement of clutches 80 and 84 are maintained, brake 92 is released and clutch 82 is engaged. An arrow is provided in FIG. 2 that emanates from the brake that is released (brake 92) and points to the clutch that is engaged (clutch 82).

The next subsequent torque ratio, indicated as $7^{th}$ (seventh gear) in the truth table of FIG. 2, is established with the engagement of brake 90 and first and third intermediate clutches 80, 84. The shift from sixth gear to seventh gear occurs as follows: the engagement of clutches 80 and 84 are maintained, clutch 82 is released and brake 90 is engaged. An arrow is provided in FIG. 2 that emanates from the clutch that is released (clutch 82) and points to the brake that is engaged (brake 90).

The next subsequent torque ratio, indicated as $8^{th}$ (eight gear) in the truth table of FIG. 2, is established with the engagement of brake 90 and second and third intermediate clutches 82, 84. The shift from seventh gear to eighth gear occurs as follows: the engagement of clutch 84 and brake 90 are maintained, clutch 80 is released and clutch 82 is engaged. An arrow is provided in FIG. 2 that emanates from the clutch that is released (clutch 80) and points to the clutch that is engaged (clutch 82).

The present invention contemplates that downshifts follow the reverse sequence of the corresponding upshift (as described above), and several power-on skip-shifts that are single-transition are possible (e.g. from 1st to 3rd). During downshift from $3^{rd}$ to $2^{nd}$, brake 92 and clutch 82 remain engaged, clutch 80 is disengaged, and brake 90 is engaged to take advantage of engine braking. During downshift from $2^{nd}$ to $1^{st}$, brake 92 remains engaged, clutch 82 is disengaged, clutch 80 is engaged, and brake 90 remains engaged to take advantage of engine braking.

While the best modes for carrying out the invention have been described in detail, those familiar with the art to which this invention relates will recognize various alternative designs and embodiments for practicing the invention within the scope of the appended claims.

The invention claimed is:

1. A transmission for a motor vehicle comprising:
an input member;
an output member;
first, second, third and fourth planetary gear sets each having first, second and third members, wherein the input member is continuously interconnected with the second member of the second planetary gear set, and the output member is continuously interconnected with the second member of the fourth planetary gear set;
a first interconnecting member continuously interconnecting the first member of the first planetary gear set with the first member of the second planetary gear set;
a second interconnecting member continuously interconnecting the second member of the first planetary gear set with the third member of the fourth planetary gear set;
a third interconnecting member continuously interconnecting the third member of the second planetary gear set with the first member of the third planetary gear set;
a fourth interconnecting member continuously interconnecting the second member of the third planetary gear set with the second member of the fourth planetary gear set;
a first torque-transmitting mechanism selectively engageable to interconnect the first member of the first planetary gear set with a stationary member;
a second torque-transmitting mechanism selectively engageable to interconnect the third member of the first planetary gear set with the stationary member;
a third torque-transmitting mechanism selectively engageable to interconnect the second member of the second planetary gear set with the first member of the fourth planetary gear set;
a fourth torque-transmitting mechanism selectively engageable to interconnect to the first member of the third planetary gear set with the first member of fourth planetary gear set; and
a unidirectional torque-transmitting mechanism configured to prevent the rotation of the first member of the first planetary gear set in a first direction, thereby interconnecting the first member of the first planetary gear set with the stationary member;
wherein the unidirectional torque-transmitting mechanism is a one-way clutch having a first race attached to the stationary member and a second race connecting the first race to the first member of the first planetary gear set, wherein the second race is non-rotatable in the first direction;
wherein the one-way clutch interconnects the first member of the first planetary gear set with the stationary member when (i) the second torque-transmitting mechanism is engaged to interconnect the third member of the first planetary gear set with the stationary member and (ii) the third torque-transmitting mechanism is engaged to interconnect the second member of the second planetary gear set with the first member of the fourth planetary gear set; and wherein the one-way clutch interconnects the first member of the first planetary gear set with the stationary member when (i) the second torque-transmitting mechanism is engaged to interconnect the third member of the first planetary gear set with the stationary member and (ii) the fourth torque-transmitting mechanism is engaged to interconnect to the first member of the third planetary gear set with the first member of fourth planetary gear.

2. The transmission of claim 1, wherein the one-way clutch disconnects the first member of the first planetary gear set with the stationary member when simultaneously (i) the second torque-transmitting mechanism is engaged to interconnect the third member of the first planetary gear set with the stationary member, (ii) the third torque-transmitting mechanism is engaged to interconnect the second member of the second planetary gear set with the first member of the fourth planetary gear set, and (iii) the fourth torque-transmitting mechanism is engaged to interconnect to the first member of the third planetary gear set with the first member of fourth planetary gear.

3. The transmission of claim 1, wherein the first torque-transmitting mechanism is engaged to interconnect the first member of the first planetary gear set with the stationary member when the transmission is downshifting.

4. The transmission of claim 1, wherein the first torque-transmitting mechanism is disengaged when the transmission is upshifting.

5. The transmission of claim 2, further comprising
a fifth torque-transmitting mechanism selectively engageable to interconnect the third member of the third planetary gear set with the first member of the fourth planetary gear set; and
wherein the torque-transmitting mechanisms are selectively engageable in combinations of at least three to establish at least eight forward speed ratios and at least one reverse speed ratio between the input member and the output member.

6. The transmission of claim 5 wherein:
the first members of the four planetary gear sets are sun gears;
the second members of the four planetary gear sets are carrier members;
the third members of the four planetary gear sets are ring gears;
the input member is continuously connected to the carrier member of the second planetary gear set; and
the output member is continuously connected to the carrier member of the fourth planetary gear set.

7. The transmission of claim 6, wherein:
the first torque-transmitting mechanism selectively interconnects the sun gear of the first planetary gear set and the sun of the second planetary gear set with the stationary member;
the second torque-transmitting mechanism selectively interconnects the ring gear of the first planetary gear set with the stationary member;
the third torque-transmitting mechanism selectively interconnects the input member and the carrier member of the second planetary gearset with the sun gear of the fourth planetary gear set;
the fourth torque-transmitting mechanism selectively interconnects the sun gear of the fourth planetary gear set with the sun gear of the third planetary gear set and the ring gear of the second planetary gear set; and the fifth torque-transmitting mechanism selectively interconnects the ring gear of the third planetary gear set with the sun gear of the fourth planetary gear set.

8. A transmission comprising:
an input member;
an output member;
first, second, third and fourth planetary gear sets each having a sun gear, a planet gear carrier and a ring gear, wherein the input member is continuously interconnected with the planet carrier of the second planetary gear set, and the output member is continuously interconnected with the planet carrier of the fourth planetary gear set;
a first interconnecting member continuously interconnecting the sun gear of the first planetary gear set with the sun gear of the second planetary gear set; a second interconnecting member continuously interconnecting the planet gear carrier of the first planetary gear set with the ring gear of the fourth planetary gear set;
a third interconnecting member continuously interconnecting the ring gear of the second planetary gear set with the sun gear of the third planetary gear set; a fourth interconnecting member continuously interconnecting the planet gear carrier of the third planetary gear set with the planet gear carrier of the fourth planetary gear set;
a first torque-transmitting mechanism selectively engageable to interconnect the sun gear of the first and second planetary gear sets with a stationary member;
a second torque-transmitting mechanism selectively engageable to interconnect the ring gear of the first planetary gear set with the stationary member;
a third torque-transmitting mechanism selectively engageable to interconnect the planet gear carrier of the second planetary gear set with the sun gear of the fourth planetary gear set;
a fourth torque-transmitting mechanism selectively engageable to interconnect the sun gear of the third planetary gear set with the sun gear of fourth planetary gear set;
a fifth torque-transmitting mechanism selectively engageable to interconnect the ring gear of the third planetary gear set with the sun gear of the fourth planetary gear set; and
a unidirectional torque-transmitting mechanism interconnecting the sun gear of the first planetary gear set with the stationary member.

9. The transmission of claim 8, wherein the unidirectional torque-transmitting mechanism is a one-way clutch.

10. The transmission of claim 9, wherein the one-way clutch includes a first race attached to the stationary member and a rotatable second race connecting the first race to the sun gear of the first planetary gear set.

11. The transmission of claim 10, wherein the one-way clutch is configured to prevent the rotation of the sun gear of the first planetary gear set in a first direction, thereby interconnecting the sun gear of the first planetary gear set with the stationary member.

12. The transmission of claim 9, wherein the torque-transmitting mechanisms are selectively engageable in combinations of at least three to establish at least eight forward speed ratios and at least one reverse speed ratio between the input member and the output member.

* * * * *